(12) United States Patent
Sayers et al.

(10) Patent No.: US 6,501,643 B1
(45) Date of Patent: Dec. 31, 2002

(54) CARRYING CASE FOR PERSONAL DIGITAL ASSISTANT DEVICE AND ANCILLARY ELECTRONIC DEVICE

(75) Inventors: Barbara A. Sayers, Victor, NY (US); John A. Olenick, Buffalo, NY (US)

(73) Assignee: Eastman Kodak Company, Rochester, NY (US)

( * ) Notice: Subject to any disclaimer, the term of this patent is extended or adjusted under 35 U.S.C. 154(b) by 65 days.

(21) Appl. No.: 09/716,100

(22) Filed: Nov. 17, 2000

(51) Int. Cl.[7] .............................. G06F 1/16; H05K 5/00
(52) U.S. Cl. ...................... 361/683; 206/576; 206/578
(58) Field of Search ........................... 361/683, 724, 361/679; 206/320, 576, 578; D14/100

(56) References Cited

U.S. PATENT DOCUMENTS

| | | | | |
|---|---|---|---|---|
| D318,858 S | * | 8/1991 | Daly et al. ................ | D14/100 |
| 5,524,754 A | * | 6/1996 | Hollingsworth ............ | 206/320 |
| 5,666,265 A | * | 9/1997 | Lutz et al. .................. | 361/683 |
| 5,960,952 A | * | 10/1999 | Chen ......................... | 206/320 |
| 6,239,968 B1 | * | 5/2001 | Kim et al. .................. | 361/679 |

* cited by examiner

*Primary Examiner*—Lynn D. Feild
(74) *Attorney, Agent, or Firm*—Mark G. Bocchetti

(57) ABSTRACT

A carrying case (either a soft case or a hard case) is taught that includes a section or compartment for receiving a personal digital assistant device that allows for access to the controls in view of the display without removing the device from the carrying case when the case is opened. Additionally, the carrying case is provided with a second compartment independent of the section or compartment for receiving the personal digital assistant device. The second compartment is adapted to receive an ancillary device such that when a user desires to use the ancillary device, the user removes the ancillary device from its compartment and also removes the personal digital assistant from its compartment and interconnects the two to allow for operation of the ancillary device. However, when the user desires to use the personal digital assistant alone, it is only necessary to open the carrying case and operate the personal digital assistant without having to remove it from the carrying case. Means are therefore provided for retaining the personal digital assistant in the carrying case when the carrying case is opened.

9 Claims, 4 Drawing Sheets

CARRYING CASE FOR PERSONAL DIGITAL ASSISTANT DEVICE AND ANCILLARY ELECTRONIC DEVICE

FIELD OF THE INVENTION

The present invention relates generally to carrying cases for consumer electronics and, more particularly, to carrying cases for personal digital assistant devices and ancillary devices adapted to be used in conjunction with personal digital assistant devices.

BACKGROUND OF THE INVENTION

The use of personal digital assistant devices (sometimes referred to as personal data assistant devices or PDAs) such as the Palm Pilot®, is becoming quite prevalent. Carrying cases for these personal digital assistant devices are generally designed to receive the device itself plus, perhaps, the note pad and one or two writing implements. With the growing popularity of personal digital assistant devices, ancillary devices designed to physically interface with personal digital assistant devices have been developed. For example, a digital camera accessory (Kodak Palm Pix® camera) is available which is adapted to interconnect with a Palm Pilot® such that a user operating the controls of the Palm Pilot® can capture images using the camera accessory, and store the images in the memory of the Palm Pilot®.

Generally, users will only want to connect ancillary devices to the personal digital assistant when the ancillary devices are to be used. For example, the PDA is only occasionally used with the camera accessory to capture images, and is more often used by itself, to retrieve phone numbers, make or check calendar entries, etc. Thus, a carrying case is needed which allows for independent storage of the personal digital assistant device and at least one ancillary device therein. In particular, when the ancillary device is an accessory digital camera, the carrying case needs to securely hold and protect the delicate camera components, such as the lens. Prior art cases for cameras are known which have independent storage for cameras and ancillary devices such as telephoto lenses and flashes. However, such prior art cases for cameras are not designed to allow use of the camera while it is in the carrying case.

SUMMARY OF THE INVENTION

It is therefore an object of the present invention to provide a carrying case for a personal digital assistant device and an ancillary device, such as a digital camera accessory, that includes independent storage of each device therein while allowing use of the personal digital assistant device without removing it from the carrying case.

Briefly stated, the foregoing and numerous other features, objects and advantages of the present invention will become readily apparent upon a review of the detailed description, claims and drawings set forth herein. These features, objects and advantages are accomplished by providing a carrying case (either a soft case or a hard case) that includes a section or compartment for receiving a personal digital assistant device that allows for access to the controls and view of the display without removing the device from the carrying case when the case is opened. Additionally, the carrying case is provided with a second compartment independent of the section or compartment for receiving the personal digital assistant device. The second compartment is adapted to receive and securely contain the ancillary device such that when a user desires to use the ancillary device, the user removes the ancillary device from its compartment and also removes the personal digital assistant from its compartment and interconnects the two, to allow for operation of the ancillary device. However, when the user desires to use the personal digital assistant alone, it is only necessary to open the carrying case and operate the personal digital assistant without having to remove it from the carrying case. Means are therefore provided for retaining the personal digital assistant in the carrying case when the carrying case is opened.

DETAILED DESCRIPTION OF THE INVENTION

Figure 1:
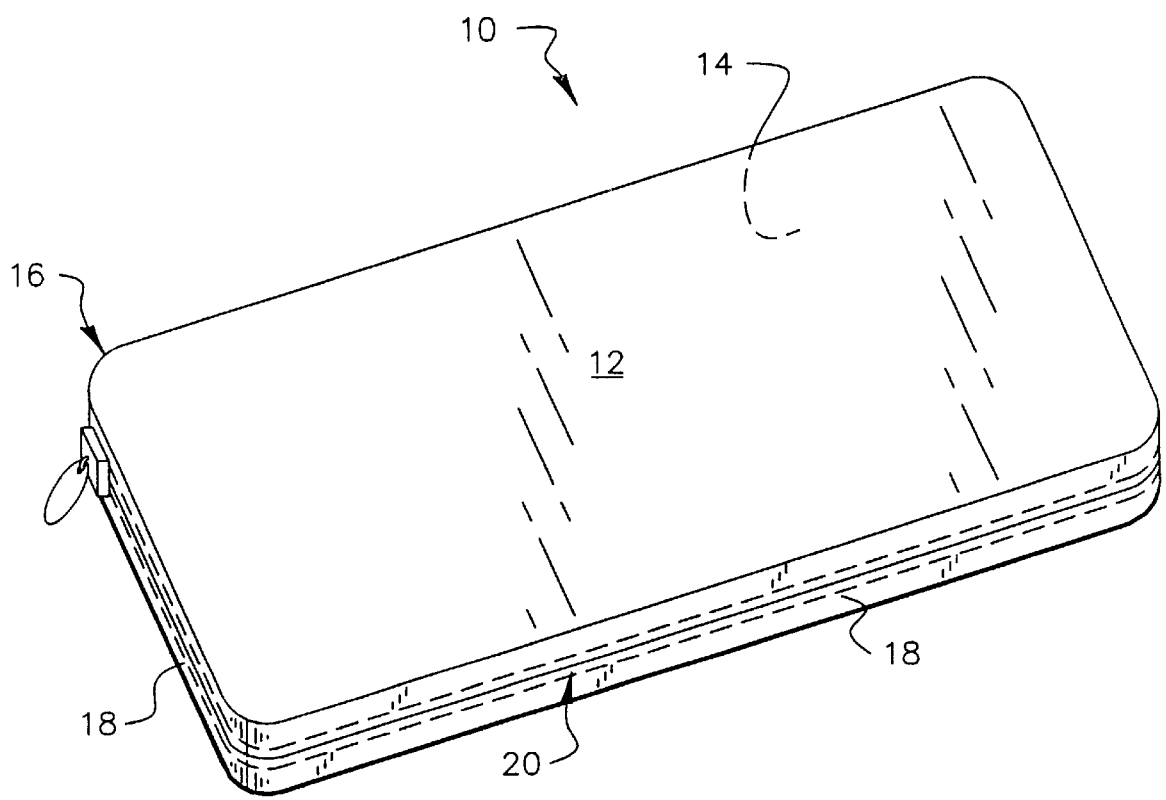
FIG. 1 is a perspective view of an exemplary carrying case of the present invention that has been closed.

Turning first to FIG. 1, there is shown a perspective view of an exemplary closed carrying case 10 of the present invention. The carrying case 10 is generally rectangular in shape such that it includes a top wall 12, a bottom wall 14, the hinge wall 16 and three openable sidewalls 18. The three openable sidewalls 18 preferably include a sliding closure mechanism 20 such as a zipper. Through operation of the sliding closure mechanism 20, the user can open the three sidewalls 18 thereby allowing access to the contents of the carrying case 10.

Figure 2:
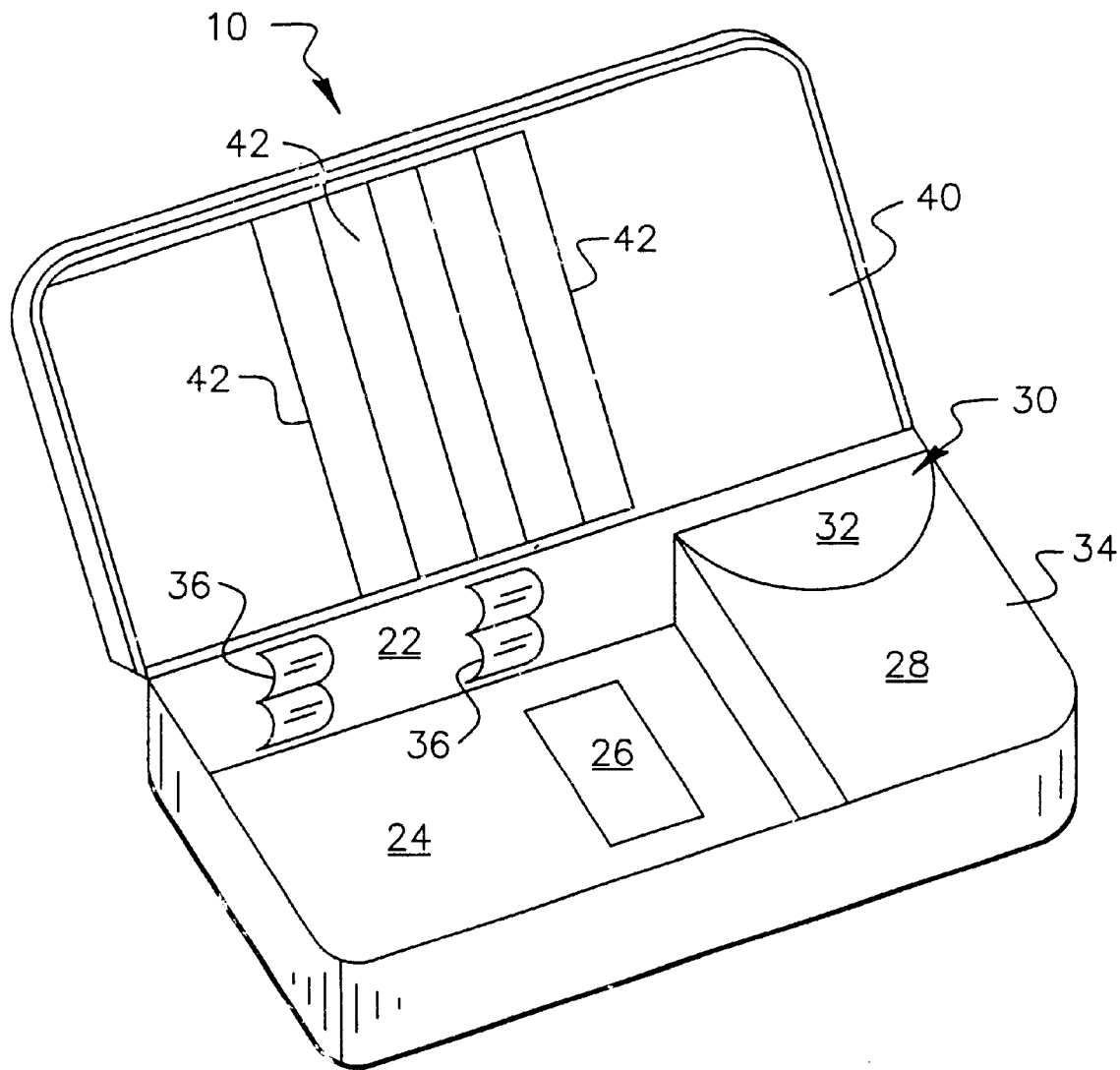
FIG. 2 is a perspective view of the exemplary carrying case of FIG. 1 in an open configuration without a personal digital assistant device stored therein.
Figure 3:
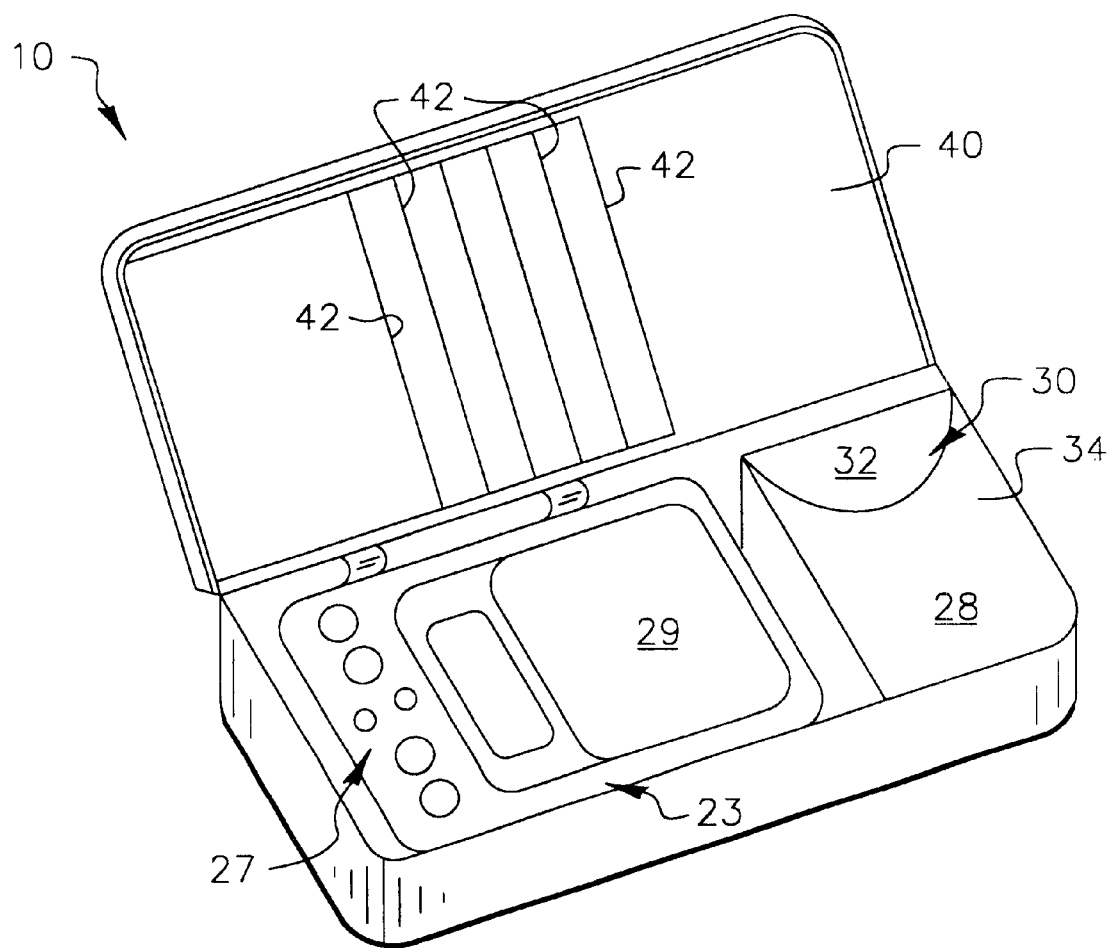
FIG. 3 is a perspective view of the exemplary carrying case of FIG. 1 in an open configuration with a personal digital assistant device stored therein.

Looking next at FIGS. 2 and 3, the carrying case 10 of FIG. 1 is shown in an open configuration. The carrying case 10 includes a first section or compartment 22 adapted to receive a personal digital assistant device 23. Compartment 22 includes internal surface 24 upon which is mounted an attachment/detachment device 26 which is preferably a hook and loop mechanism such as Velcro®. The attachment/detachment device 26 is adapted to engage with a corresponding attachment/detachment device (not shown) attached by adhesive to a rear surface of the personal digital assistant 23. Thus, if a Velcro® strip is used for attachment/detachment device 26 then the corresponding attachment/detachment device affixed to the rear surface of the personal digital assistant 23 would also be a Velcro® strip. Through normal operation of Velcro®, the personal digital assistant 23 is releasably retained in carrying case 10. Other attachment/detachment devices 26 may be substituted for Velcro® strips. For example, the internal surface 24 may be provided with a double-sided adhesive foam pad.

Figure 4:
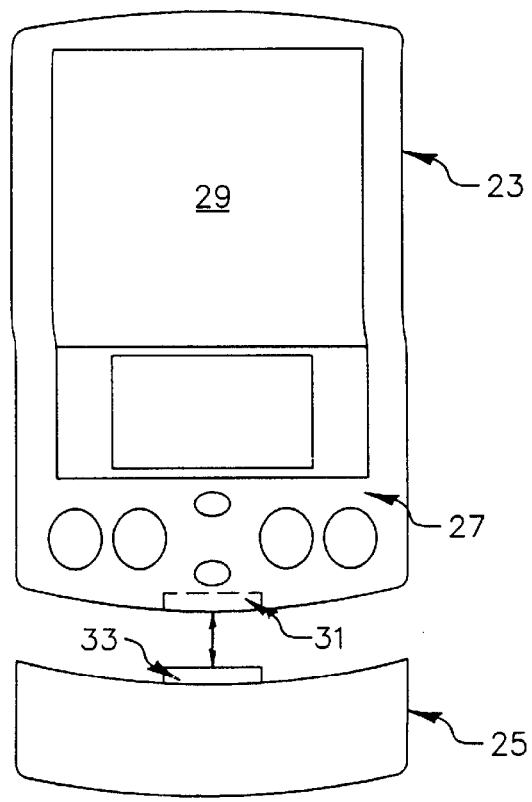
FIG. 4 is a top plan view of the exemplary ancillary digital camera and exemplary personal digital assistant detached from each other.

Positioned above first compartment 22 is a second compartment 28. Second compartment 28 preferably provides a full enclosure for an ancillary device, such as ancillary digital camera 25 shown in FIG. 4. Second compartment 28 includes an access 30 therein allowing the user to open second compartment 28 to remove the contents therefrom. Access 30 is preferably one wall of second compartment 28 and includes an extending flap portion 32. Flap portion 32 in conjunction with a top surface 34 of second compartment 28 preferably includes a closing mechanism such as Velcro®, snaps, buckles, straps, etc. for retaining flap portion 32 in a closed position. Second compartment 28 is adapted to receive the ancillary digital camera 25. To further protect ancillary digital camera 25, the second compartment 28 is preferably formed using a relatively thick, padded material with a plush inner surface, in order to protect delicate components, such as the lens, from scratches or other damage due to handling.

Figure 5:
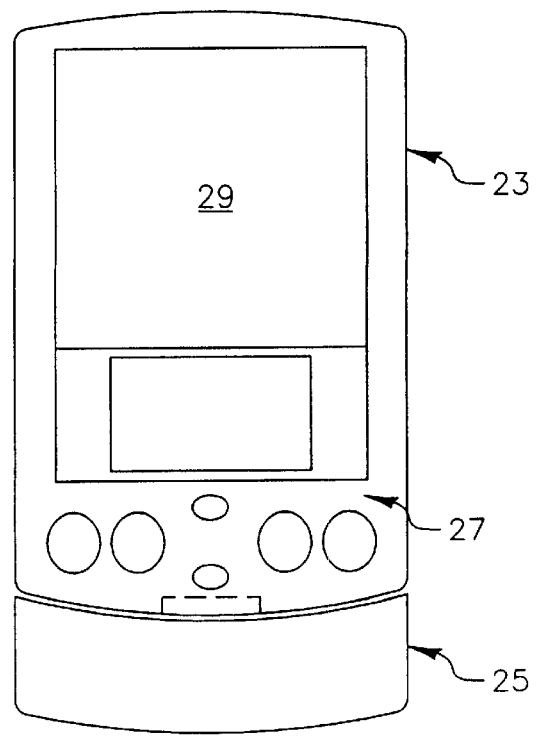
FIG. 5 is a top plan view of the exemplary ancillary digital camera attached to the personal digital assistant.

When a user desires to use the ancillary digital camera, he or she need merely open the flap portion 32 and remove the ancillary digital camera 25 from the second compartment 28. The user then disengages the personal digital assistant 23 from the first compartment 22 and interconnects the ancillary digital camera 25 to the personal digital assistant 23 by mating connector 31 on the personal digital assistant 23 with corresponding connector 33 on the ancillary digital camera 25 . In this manner, the user can then operate the ancillary digital camera 25, as shown in FIG. 5. When the user desires to use the personal data assistant 23 without the ancillary digital camera 25, he or she need merely open the carrying case 10 thereby providing access to the controls 27 and display 29 of the personal data assistant without removing the personal data assistant 23 from the carrying case 10.

The carrying case 10 may also include straps 36 attached to the inside face of hinge wall 16 adapted to receive a writing implement (not shown). Additional loops (not shown) may also be provided for receiving other writing implements (not shown). The inside wall 40 opposite the first and second compartments 22, 28 may be configured to receive a variety of other items including, for example, a note pad, business cards, credit cards, etc. As depicted in FIGS. 2 and 3, inside wall 40 includes a plurality of overlaid pouch slots 42 for receiving business cards, credit cards and the like.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 carrying case
12 top wall
14 bottom wall
16 hinge wall
18 openable sidewalls
20 sliding closure mechanism
22 first compartment
23 personal digital assistant device
24 internal surface
25 ancillary digital camera
26 attachment/detachment device
27 controls
28 second compartment
29 display
30 access
31 mating connector
32 extending flap portion
33 corresponding connector
34 top surface
36 straps
40 inside wall
42 overlaid pouch slots

What is claimed is:

1. A carrying case for a personal digital assistant comprising:
   (a) a top wall, a bottom wall, a hinge wall, and three openable sidewalls;
   (b) a first compartment adapted to receive the personal digital assistant;
   (c) means for releasably retaining the personal digital assistant within the first compartment such that the personal digital assistant can be operated while retained in the first compartment; and
   (d) a second compartment providing residence for an ancillary electronic device, the ancillary electronic device adapted to physically interface with the personal digital assistant when both the personal digital assistant and the ancillary electronic device are removed from the carrying case, the second compartment being independent from the first compartment such that either or both the personal digital assistant and the ancillary electronic device can be removed from the carrying case, the second compartment completely enclosing the ancillary electronic device therein.

2. A carrying case as recited in claim 1 further comprising:
a slide closing mechanism for opening and closing the three openable walls.

3. A carrying case as recited in claim 2 wherein:
the slide closing mechanism is a zipper.

4. A carrying case as recited in claim 1 wherein:
the second compartment includes a flap portion and closing mechanism for retaining the ancillary electronic device in the second compartment.

5. A carrying case as recited in claim 1 wherein:
the means for releasably retaining the personal digital assistant within the first compartment is a first hook and loop type mechanism attached to an inside surface of the carrying case and a second hook and loop type mechanism attached to a rear surface of the personal digital assistant.

6. A carrying case as recited in claim 1 wherein:
the ancillary electronic device when connected to the personal digital assistant functions as a digital camera, the second compartment being formed of a padded material with a plush inner surface.

7. A carrying case for a personal digital assistant comprising:
   (a) a first compartment adapted to receive the personal digital assistant;
   (b) means for releasably retaining the personal digital assistant within the first compartment such that the personal digital assistant can be operated while retained in the first compartment; and
   (c) a second compartment providing residence for an ancillary electronic device, the ancillary electronic device adapted to physically interface with the personal digital assistant when both the personal digital assistant and the ancillary electronic device are removed from the carrying case, the second compartment being independent from the first compartment such that either or both the personal digital assistant and the ancillary electronic device can be removed from the carrying case, the second compartment completely enclosing the ancillary electronic device therein.

8. A carrying case as recited in claim 7 wherein:

the second compartment is formed of a padded material with a plush inner surface.

9. A protective case comprising:

(a) a first compartment;

(b) a personal digital assistant residing in the first compartment;

(c) means for releasably retaining the personal digital assistant within the first compartment such that the personal digital assistant can be operated while retained in the first compartment; and (d) a second compartment providing residence for an ancillary electronic device, the ancillary electronic device adapted to physically interface with the personal digital assistant when both the personal digital assistant and the ancillary electronic device are removed from the carrying case, the second compartment being independent from the first compartment such that either or both the personal digital assistant and the ancillary electronic device can be removed from the carrying case, the ancillary electronic device when connected to the personal digital assistant functioning as a digital camera, the second compartment being formed of a padded material with a plush inner surface, the second compartment completely enclosing the ancillary electronic device therein.

* * * * *